United States Patent Office 3,301,335
Patented Jan. 31, 1967

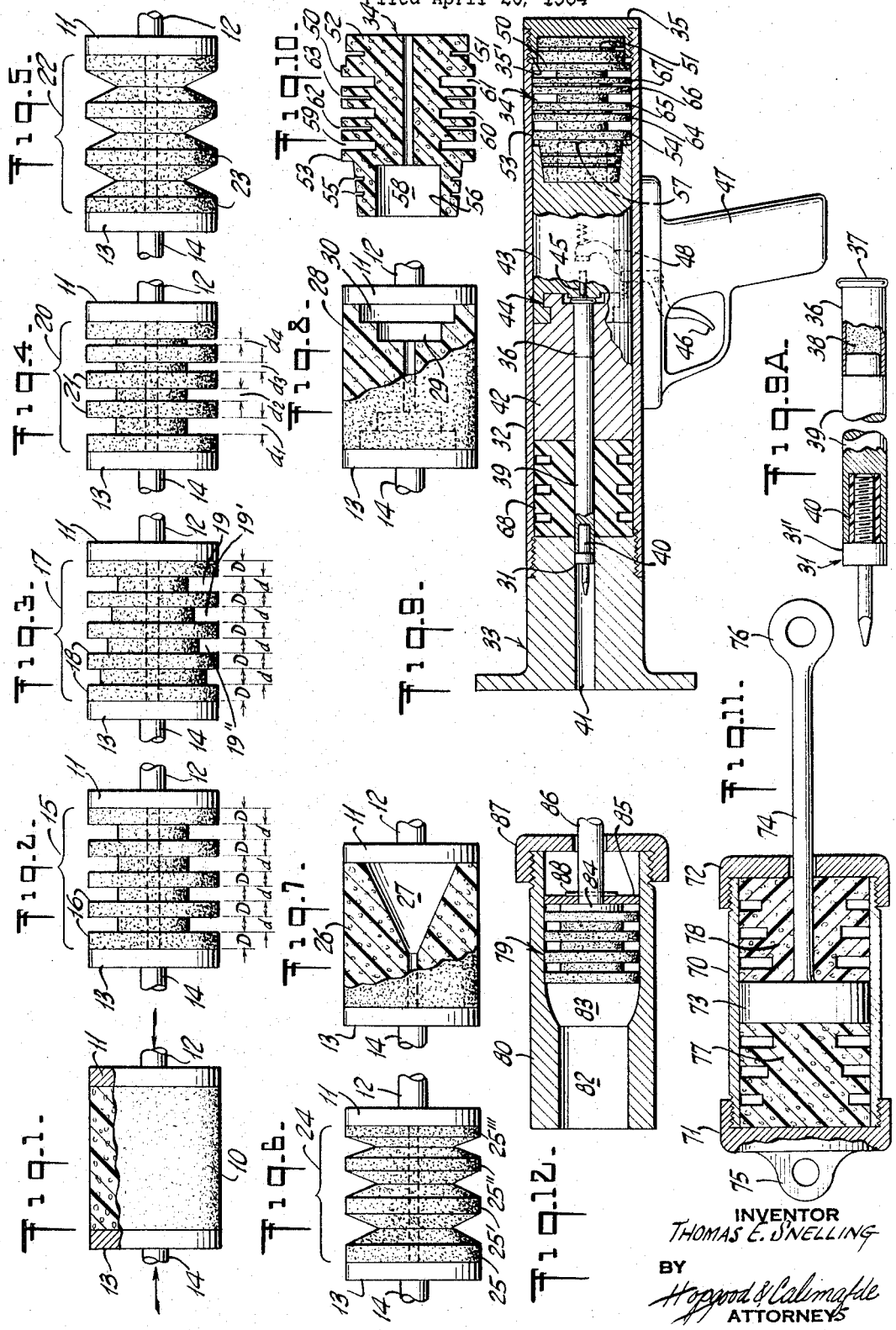

3,301,335
ENERGY ABSORBING STRUCTURE
Thomas E. Snelling, Rte. 2, Box 792,
Boring, Oreg. 97009
Filed Apr. 20, 1964, Ser. No. 360,941
28 Claims. (Cl. 173—162)

My invention relates to structures for absorbing mechanical energy and has independent utility in applications involving recycled operation (i.e., in which energy-absorption is relatively non-destructive of materials) and in one-shot applications (in which energy-absorption may involve the destruction or crushing of materials).

The traditional techniques for yieldably sustaining varying mechanical load have largely involved springs and dash pots of one form or another. Where the dynamic load range has been great, and deflection space is at a premium, various relatively complex schemes have been utilized, such as successive action of plural spring elements having different spring constants. Where the load transients present high-frequency components both under light-load and heavy-load conditions, dash-pot design becomes relatively complex. In general, I know of no single prior structure which can adequately sustain an extended range of load variation and mechanical shock within extreme space limitations.

It is, accordingly, an object of the invention to provide improved means for absorbing transient mechanical shock or load variations.

Another object is to provide an energy-absorbing structure of elemental simplicity and having inherent capacity for sustaining load fluctuations with equal efficacy at each of a plurality of substantially different load levels.

It is also an object to meet the above objects with a structure presenting superior capacity for sustaining large mechanical shock or impact within minimum space limitations.

It is a specific object to meet the above objects with structures utilizing foamed plastic material as the prime means of energy absorption and dissipation.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a simplified view in side elevation, partly broken-away and sectioned in the plane of a longitudinal thrust axis, to illustrate basic components of a shock or load absorbing mechanism;

FIGS. 2 to 8, inclusive, are views similar to FIG. 1 but illustrative of various forms of the invention;

FIG. 9 is a view in side elevation of an impact tool embodying shock-absorbing means of the invention; the view being for the most part broken-away and sectioned in the vertical plane through the thrust axis;

FIG. 9A is an enlarged view in partial section to illustrate a loaded cartridge for use in the tool of FIG. 9;

FIG. 10 is an enlarged cross-sectional view of recoil-absorbing means of the tool of FIG. 9; and FIGS. 11 and 12 are views similar to FIG. 9, but illustrative of two further embodiments of the invention.

Briefly stated, the invention contemplates various employments of a solid mass of foamed plastic material having a generally prismatic external contour, to sustain one or more transient applications of force (load, thrust) on an alignment axis passing through the mass. Various resilient, compliant, resistive, and reactive constants are made to characterize the performance of such a mass by forming it with different effective cross-sectional areas in spaced planes normal to the force axis. Three specific devices utilizing basic energy-absorbing structural elements of my invention will be described.

In FIG. 1, I show basic elements of a shock-absorbing mechanism, comprising a prismatic solid mass of foamed plastic material, which for convenience is an elongated cylinder 10. Generally, I have used and prefer foamed urethane plastic, although the structures and principles to be discussed are applicable to foamed versions of other materials, such as polyethylene and polystyrene, for example. For purposes of simplified description, forces sustained by the mass 10 will be assumed to be applied uniformly over the end areas of the cylinder; thus, a plate or piston 11 and associated rod 12 may be the instrumentality of applying a force to the left, and another plate or piston 13 and associated rod 14 may be the instrumentality of opposed or reacting force application. For any given foamed material at 10, and for any given density thereof, the mass 10 will absorb a limited range of load variations, restoring itself to its original undeformed length, as long as peak loads have not exceeded the elastic limit, that is, as long as there is no damage to the cellular core of the material 10.

In accordance with the invention, very much greater load variations and impacts can be sustained by a given mass of foamed material by varying and controlling the cross-sectional area of the mass as a function of distance along the thrust axis. In the arrangement of FIG. 2, such variation is a regular pattern, extending the full length of the foamed plastic element 15, being characterized by plural circumferentially extending external grooves of uniform width $d$, spaced from each other by disc-like flange projections 16 of uniform width D. In use, the mass 15 of FIG. 2 actually behaves as if one had two foams of different materials or densities. If a gradual build-up of compression is applied to 12–13 to squeeze element 15 along its axis, the gaps $d$ at flanges 16 close uniformly, until these gaps are reduced to zero and the flanges 16 are mutually supporting, in the manner of a solid element such as described at 10 in FIG. 1. Thus, until gaps $d$ have been reduced to zero, the element 15 exhibits first resistance, stiffness and compliance characteristics, with a first capacity to accommodate, cushion or absorb a first range of load variations or impacts; thereafter, namely when the flanges 16 are mutually supporting, second resistance, stiffness and compliance characteristics are available to offer further (and greater) capacity to accommodate, cushion, or absorb a second range of load variations and impacts. Having compressed the gaps $d$ to zero, the element 15 has become a complex of different densities, the greater densities being primarily centrally located, the lesser densities being near the outer limits of flanges 16; the ability to present such a range of densities, particularly for the heavier fluctuating load conditions, and under sharp impact conditions characterized by a wide spectrum of frequency components, will be appreciated as being particularly valuable, in that tendencies to resonate at any particular frequency are minimized and extreme damping is promoted.

In the arrangement of FIG. 3, I illustrate that an even greater and more gradual accommodation of load variation may be achieved in the foamed element 17 by offering different reduced cross-sectional areas at each of the grooves between flanges 18. The depths of these grooves may assume a random pattern of variation from one to the next, but in the form shown, groove depth increases for successive grooves, extending from left to right in FIG. 3; all flanges 18 and the grooves between them are shown as having the uniform widths D and $d$, respectively, as described for FIG. 2. In use, the element 17 performs generally similarly to FIG. 2 except that the gaps $d$ for which lesser cross-sectional body support is available are the first to close up, under conditions of increasing compressional load. Thus in FIG. 3, the gap 19 is first to close to zero, after which the flanges at gap 19 are in full supporting abutment to bear an increased measure of the increasing load, which then is primarily operative to reduce the gap 19' of the then-smallest supporting cross-sectional area. Another flange is then added to the cushioning capacity, as the next gap 19" is reduced. The process repeats successively for as many gaps as there are, and the density variation and distribution, although symmetrical about the load or thrust axis 12–14, is nevertheless of such complexity as to assure great non-resonant damping capicity, throughout the full range of load variation.

In the foamed element 20 of FIG. 4, all circumferential grooves between adjacent flanges 21 are of uniform depth, but performance approximating that described for FIG. 3 is achieved by providing variation in groove width; such various widths have been designated $d_1$, $d_2$, $d_3$, $d_4$, in order of decreasing size. Thus, in the presence of increasing load, all gaps become narrow at substantially the same rate until the shortest gap $d_4$ is closed, whereupon the flanges defining gap $d_4$ are in full supporting abutment to bear an increased measure of the increasing load. The process repeats, as successively larger gaps are closed, the flanges progressively increasing their share of sustaining the load.

In the foamed element 22 of FIG. 5 the flanges 23 are spaced by circumferential grooves having at least one wall which is conically tapered, so as to define cross-sectional areas which vary more uniformly as a function of distance along the load or thrust axis 12–14; in the specific form shown, all grooves are of like depth and are characterized by opposed uniformly tapering side walls. In the presence of increasing load, all gaps tend to close in unison but the resistance to closure builds up at a greater rate prior to closure than is the case, for example, in the FIG. 2 structure. Again, as with all embodiments of my invention, the variety of densities achieved for increasing load conditions is such as to promote extreme damping of load transients.

The foamed element 24 of FIG. 6 exhibits much the same performance as the element 22 of FIG. 5, except that by providing gaps of different width between successive flanges 25, 25', 25", 25''', there results a greater range of density variety over the range of load variation, as successive gaps are closed. For example, by the time all gaps are closed, the material between flanges 25–25' will have been more densely compacted than that between flanges 25'-25", and so on, for the material between successive flanges 25"–25''' having narrower initial gaps. To achieve the characteristic substantially as described for FIG. 6, the converging walls of all gaps may be similarly sloped, the narrower gaps being achieved by lesser groove depths; however, in the form shown, all grooves are of equal depth, and the wall slopes for narrower grooves are steeper than those for wider grooves.

The foamed element 26 of FIG. 7 illustrates that cross-sectional area variation as a function of length along the load or thrust axis 12–14 may be achieved by interior rather than exterior surface contour treatment. In FIG. 7, the bore 27 is generally conical, so that the area variation is essentially a square-law function of axial distance. This square-law relation characterizes the build-up of cushioning ability in the presence of increasing loads or impacts, and a wide variety of densities is achieved with load build-up.

In the foamed element 28 of FIG. 8, the variation of cross-sectional area is a step function of axial distance. This is provided by first and second counterbores 29–30 which characterize each axial end of the structure. With increasing load, the counterbore 30 (at which the supporting cross-sectional area is smallest) is first to reduce to zero axial length in a first range of load cushioning; thereafter, the counterbore 29 becomes more compressed in a second range of load cushioning, after which the full effective body cross-sectional area takes the then-heavier loads.

In the various illustrative elemental forms thus far described, it will be appreciated that the further build-up of compressional load may compress the entire body of foamed plastic, with its particular distribution of various densities and that in the final stages of extreme load it may be useful to rely on destruction (crushing) of the plastic to absorb a transient (one-shot) load.

It will be appreciated that the various different foamed-element constructions of the invention have been described in the context of generally cylindrical forms, in order that closer comparison may be made of the changes resulting from the individual contour (or cross-sectional area) characterizing techniques described for various typical embodiments. Also, the description and showing has been deliberately such as to isolate different effects, to make for greater understanding. In practice, therefore, it will be appreciated that particular operational circumstances may call for foamed-element area-characterizing which represents a combination of one or more of the arrangements described. Such a specialized application of the principles of the invention is illustated in FIGS. 9 and 10.

The device of FIG. 9 is an impact tool or gun which relies upon the firing of an explosive charge, reacting primarily against an inertial mass, to drive the anchoring shank of a stud bolt 31 or the like into permanent assembly with a hard base, such as concrete. In general, the gun of FIG. 9 comprises an elongated cylindrical casing 32 secured at one end to a head fitting 33 which is flanged to provide stabilized location on the surface into which the stud bolt 31 is to be driven. The other end of casing 32 is closed by a cap 35 which retains a foamed recoil-absorbing plastic element 34 of the invention; this element 34 is shown in greater detail in FIG. 10.

The impact for driving the stud bolt or fitting 31 is developed upon firing a pre-loaded cartridge, illustrated in greater detail in FIG. 9A. The cartridge assembly is shown to comprise a shell 36 having a radial flange 37 at its base and containing an explosive charge 38. The discharge end of shell 36 is closed by crimping over the reduced end of an elongated piston 39. The other end of piston 39 may be bored and tapped to receive the threaded shank of the fitting 31; fitting 31 is shown to include a central locating flange 31', and in order to provide greatest protection for the threads of fitting 31, the axial end rim and the bottom of the bore of piston 39 preferably abut the flange 31' and the end of the threaded shank, respectively. In the form shown, friction-engagement rather than threaded engagement is relied upon to temporarily hold fitting 31 on the end of piston 39, and for this purpose I show a thin flexible sleeve 40, which may be of polyethylene tubing, stretched over the stud-bolt threads and frictionally engaging the bore at the delivery end of piston 39. Preferably, the diameters of bolt flange 31' and of the main body of piston 39 and shell 36 are essentially the same and have close guided clearance relation with supporting guide bores of the gun, as for example the bore 41 of the head member 33.

Inertial mass, against which the stud-driving mechanism reacts, is provided by first and second members 42–43 which are removably secured to each other (for loading purposes), as by a bayonet-locking engagement (suggested at 44), and which are slidably guided by the inner wall of casing 32. The forward member 42 is bored to guide and locate the cartridge assembly of FIG. 9A, with flange 37 positioned for firing. The rear member 43 supports a firing pin 45 and suitable associated firing mechanism, which may be released by a trigger 46 on a hand grip 47 forming part of or secured to the casing 32. Dotted outlines suggest that the firing mechanism has been cocked, with trigger 46 latching a spring-loaded firing arm 48 in readiness for operation.

Upon firing the charge 37, piston 39 and stud bolt 31 are driven forward by explosive impact, involving reaction against the much greater inertial mass of members 42–43. There is nevertheless substantial rearward momentum in members 42–43, and this has been found to be intolerable to a human operator if conventional spring or other shock-absorbing techniques are attempted. However, the foamed element 34 has provided highly satisfactory results, with complete operator tolerance. Several of the different individual techniques of FIGS. 2 to 8 will be recognized in the foamed element 34; these features are perhaps best described by reciting the various stages of absorption of increasing compressional load intensity in element 34.

First, it is to be noted that the rim 35' of cap 35 clears the adjacent foamed flange 50 to an extent at least as great as the width of a groove 51 in the base-locating hub 52 which bottoms in the cap 35. Similarly, at the forward end the foamed flange 53 clears the adjacent rim 54 of member 43 to an extent at least as great as the combined widths of grooves 55 in the counterbored hub 56; also, a central projection or piston part 57 of member 43 clears the bottom of counterbore 58 to at least this same extent, namely, the combined widths of grooves 55. Major circumferential grooves 59–60–61 between flanges 50–53 are of different depths, and secondary grooves 62–63 of lesser width and depth separately define intermediate flanges 64–65–66–67. Successive contributions to recoil absorption by foamed member 34 take place as follows, for load build-up:

(1) Basic initial footing is taken by contact of the left-end face of hub 56 with inertial member 43, on the one hand, and by contact of the right-end face of hub 52 with the cupped bottom of cap 35, on the other hand.

(2) The least cross-sectional area is presented at groove 59, and so the gap at this groove closes as initial resistance is offered.

(3) Thereafter, the least cross-sectional area is presented at groove 60, followed by groove 61, and so the gaps at these grooves successively close as mounting resistance is offered.

(4) During closure of gaps 59–60–61, the progressive sharing of load via flanges 53–62, 65–66, and 67–50 produced closure of the secondary grooves 62–63, resulting in full compacting of the main body between flanges 53 and 50.

(5) Gaps at grooves 55 close as hub 56 is compressed within the stated clearances; by the time these clearances are closed, the inertial member 43 bears against the full effective end area of foamed member 34, namely, at flange 53, at the end face or rim of hub 56, and over the bottom or seat area of counterbore 58.

(6) Just before closure of the last gap (at groove 51) and the related clearance at rim 35', resistance to further compression has mounted so far, and so much momentum in members 42–43 has been absorbed, that substantially nothing further remains to be absorbed. Reaction on the operator is thus inconsequential.

It will be appreciated that for reliable operation of the firing mechanism, uniform positioning of the cartridge (with respect to the head end) and for secondary recoil absorption, it is not only desirable that foamed member 34 shall have adequate initial static stiffness to assure longitudinal positioning reference for members 42–43, but also that a further foamed absorber 68 of the invention be provided between members 42–43. The desired stiffness and described absorption properties in member 34 (both prior to crushing) can be satisfactorily provided using a foamed urethane plastic available commercially and known as Pelron's 5.5 lbs./cu.ft. #9839 two-component resin system. In the impact-tool application of FIG. 9, the member 34 has an unstressed overall length of three inches, which compresses to 2.5 inches under the load required to close all gaps, and the diameter of the larger flanges 53–64–65–66–67–50 is two inches.

In FIG. 11, I illustrate in simplified form a further specific application of principles of the invention to a preloaded double-acting shock-absorber, as for automotive use. The device is contained within an elongated tubular casing 70, closed by head and tail closure caps 71–72. A piston 73 is slidably guided in the casing bore, and a rod 74 secured to piston 73 is guided in a central opening in tail 72. Eyes or other fittings 75–76 at head 71 and at the exposed end of rod 74 provide means of attachment to other mechanism, as desired. The respective stroke directions of piston 73 are cushioned by foamed plastic elements 77–78 of the invention, both elements 77–78 being grooved in accordance with the teachings of FIG. 3. In order that the restorative properties of the foamed plastic may be utilized for increased double-acting resilience in the device of FIG. 11, the unstressed axial lengths of members 77–78 (combined with the effective thickness of piston 73) are preferably in excess of the length of casing 70. Thus, the setting of closures 71–72 involves preloading or pre-compressing of members 77–78. This relationship will be seen to retard the rate at which piston 73, once deflected, will be restored to equilibrium position, and both members 77–78 will tend to "track" piston 73 at all times.

In the arrangement thus far discussed, energy-absorption and dissipation have taken place in the foamed plastic element or elements without attendant destruction (crushing) of the foamed plastic. In certain applications of a "one-shot" nature, destruction of the foamed plastic is tolerable, and in FIG. 12 I illustrate such an application, in which a given small space exhibits large capacity to absorb an impacting load. The absorber of FIG. 12 comprises a casing 80 with a bore of large radius at 81 near one axial end and with a bore of smaller radius at 82 on the same axis and near the other axial end. At an intermediate region 83, the bore tapers between the two sizes and the curvature at transition from the larger radius to the tapering region is preferably smooth and tangential (i.e., continuous), as shown. A foamed shock-absorbing element 79 is shown to be grooved in accordance with the teachings of FIG. 2 and to be of external diameter to fit and be located by the large radius part 81 of the bore. Piston means is shown to comprise a first plate-like element 84 of diameter to clear the smaller bore diameter at 82 and to be centrally positioned by a second plate-like element 85 which rides in and is guided by the large part 81 of the bore. Elements 84–85 are connected for mutually guided longitudinal sliding support, for which purpose a rod 86 carried by plate 84 is slidable in a central opening in plate 85. Rod 86 also extends through and is guided by a central opening in a closure cap 87, threaded to the large-bore end of the casing 81. A yieldable member, such as a shear pin 88 carried by rod 86 holds plates 84–85 together until such extreme compressional force is applied via rod 86 that plate 85 interferes with tapering section 83. In use, initial compressional (axial) forces via rod 86 are transferred to foamed element 79 via the piston means, the reaction to the casing 80 being one of radially compressing the successive flanges of element 79. Actually, these are so severely compressed that in the process they are partly destroyed (crushing). Once plate 85 interferes with the taper 83, further force shears pin 88, and guided further compression of element 79 continues, with attendant greater resistance. Preferably, the bottoms of grooves in the foamed element 79 are of diameter substantially equal to the smaller bore diameter at 82, although different desirable results may be achieved for departures both sides of this equality, depending on the hardness and density of the foamed material employed.

The various foamed elements which have been described may be formed by foaming controlled quantities of resin components into molds of desired shape, but I have employed lathe-turning and boring techniques to cut the grooves and other indicated shapes and contours in stock that has already been foamed into tubular or cylinder shape. For chucking and centering purposes, it is desirable to have a small bore on the axis of the foamed stock; such a bore has been indicated in dotted outline in all showings but is unnecessary to achievement of desired shock-absorbing results.

It will be seen that I have described improved shock-absorbing structures of elemental simplicity and having inherent capacity for sustaining load fluctuations with equal efficacy at each of a plurality of substantially different load levels. Superior capacity to sustain great mechanical shock is possible within minimum space and weight limitations. Inherent in all described forms is a unique non-resonant damping feature, by reason of the variety of densities achieved as load is applied. The invention is applicable both to situations in which the foamed crushable elements sustains repeated recycled impact and to "one-shot" situations where destruction is tolerable.

While I have described the invention in detail for the preferred forms shown, it will be understood that modifications may be made within the scope of the invention as defined in the claims which follow.

I claim:

1. An energy-absorbing structure, comprising a solid mass of compressionally yieldable foamed plastic material having a generally prismatic external contour which is adapted to sustain a transient application of force on an alignment axis passing through said mass, said mass being characterized by different effective cross-sectional areas in spaced planes normal to said axis and first and second opposed relatively incompressible load-sustaining members in compressional load-applying relation with the axial ends of said mass, said members being of effective cross-sectional areas embracing the maximum cross-sectional area of said mass.

2. The structure of claim 1, in which said mass has a peripherally extending groove defining said area characterization, one of the walls of said groove including a surface sloping away from and therefore generally flared with respect to said axis.

3. An energy-absorbing structure, comprising a solid mass of compressionally yieldable foamed plastic material having a generally prismatic external contour which is adapted to sustain a transient application of force on an alignment axis passing through said mass, said contour including a generally cylindrical portion concentric with said axis, said generally cylindrical portion having a circumferentially continuous groove, whereby said cylindrical portion is characterized by a first cross-sectional area at a first plane normal to said axis and spaced from said groove, and by a second cross-sectional area at a second plane normal to said axis at the location of said groove and first and second opposed relatively incompressible load-sustaining members in compressional load-applying relation with the axial ends of said mass, said members being of effective cross-sectional areas embracing the maximum cross-sectional area of said mass.

4. The structure of claim 3, in which one of the walls of said groove is generally conically flared.

5. An energy-absorbing structure, comprising a solid mass of compressionally yieldable foamed plastic material having a generally prismatic external contour which is adapted to sustain a transient application of force on an alignment axis passing through said mass, said contour including a generally cylindrical portion concentric with said axis, said generally cylindrical portion having a bore along said axis and a circumferentially continuous external groove overlapping part of the bore, whereby said cylindrical portion is characterized by a first cross-sectional area at a first plane normal to said axis and spaced from said groove, and by a second cross-sectional area at a second plane normal to said axis at the location of said groove and first and second opposed relatively incompressible load-sustaining members in compressional load-applying relation with the axial ends of said mass, said members being of effective cross-sectional areas embracing the maximum cross-sectional area of said mass.

6. An energy-absorbing structure, comprising a solid mass of compressionally yieldable foamed plastic material having a generally prismatic external contour which is adapted to sustain a transient application of force on an alignment axis passing through said mass, said contour including a generally cylindrical portion concentric with said axis, said generally cylindrical portion having a plurality of longitudinally spaced circumferentially continuous external grooves, whereby said cylindrical portion is characterized by an effective cross-sectional area in planes normal to said axis, which area varies as a function of distance along said axis and first and second opposed relatively incompressible load-sustaining members in compressional load-applying relation with the axial ends of said mass, said members being of effective cross-sectional areas embracing the maximum cross-sectional area of said mass.

7. The structure of claim 6, in which the effective radial depth of one of said grooves differs from that of another of said grooves.

8. The structure of claim 6, in which the effective width of one of said grooves differs from that of another of said grooves.

9. An energy-absorbing structure, comprising a solid mass of compressionally yieldable foamed plastic material having a generally prismatic external contour which is adapted to sustain a transient application of force on an alignment axis passing through said mass, said contour including a generally cylindrical portion concentric with said axis, said generally cylindrical portion having a bore on said axis, the bore having a first effective radius at a first plane normal to said axis and having a different effective radius at a second plane normal to said axis, whereby said cylindrical portion is characterized by different cross-sectional areas at said first and second planes and first and second opposed relatively incompressible load-sustaining members in compressional load-applying relation with the axial ends of said mass, said members being of effective cross-sectional areas embracing the maximum cross-sectional area of said mass.

10. The structure of claim 9, in which the bore radius varies continuously as a function of distance along said axis between said first and second planes.

11. The structure of claim 10, in which the bore radius varies as a step function along said axis between said first and second planes.

12. In a tool of the character indicated, an enclosing frame, a reaction mass supported within said frame for limited relatively free longitudinal movement on an impact-driving axis, impact-driving means having a reactively based relation with said mass and having an impact-driving output in a forward direction on said axis, and recoil absorbing means contained within said frame and positioned to be compressed between said mass and a rear part of said frame as said mass is displaced rearwardly on said axis upon operation of said impact-driving means, said recoil-absorbing means comprising an elongated mass of foamed plastic material having an outer limit peripherally confined by said frame and characterized by different effective cross-sectional areas in spaced planes normal to said axis.

13. In a tool of the character indicated, an enclosing frame, a reaction mass supported within said frame for limited relatively free longitudinal movement on an impact-driving axis, impact-driving means having a reactively based relation with said mass and having an impact-driving output in a forward direction on said axis, and recoil-absorbing means contained within said frame and positioned to be compressed between said mass and a rear part of said frame as said mass is displaced rearwardly on said axis upon operation of said impact-driving means, said recoil-absorbing means comprising an elongated mass of foamed plastic material having an external contour which includes a generally cylindrical portion concentric with said axis and peripherally confined by said frame, said generally cylindrical portion having plural longitudinally spaced radially outwardly directed circumferential grooves therein.

14. In a tool of the character indicated, an enclosing frame, a reaction mass supported within said frame for limited relatively free longitudinal movement on an impact-driving axis, impact-driving means having a reactively based relation with said mass and having an impact-driving output in a forward direction on said axis, and recoil-absorbing means contained within said frame and positioned to be compressed between said mass and a rear part of said frame as said mass is displaced rearwardly on said axis upon operation of said impact-driving means, said recoil-absorbing means comprising an elongated mass of foamed plastic material peripherally confined by said frame and characterized by different effective cross-sectional areas in spaced planes normal to said axis, and further recoil-absorbing means contained within said frame and positioned to be compressed between said mass and a forward part of said frame as movement of said mass is reversed by reaction against said first-mentioned recoil-absorbing means, said further recoil-absorbing means comprising an elongated mass of foamed plastic material peripherally confined by said frame and characterized by different effective cross-sectional areas in spaced planes normal to said axis.

15. The tool of claim 14, in which said two masses of foamed plastic are of different density, the density of the material of said first-mentioned recoil-absorbing means being greater than that of said further recoil-absorbing means.

16. A mechanical shock absorber, comprising an elongated housing having a bore on an axis of thrust to be absorbed, a piston supported for guided longitudinal movement on said axis and within said bore, said housing including end closures for said bore, externally accessible connecting means carried by said piston and adapted for connection to a member whose motion with respect to said housing is to be cushioned by said absorber, a first elongated mass of foamed plastic material between said piston and one end closure, and a second elongated mass of foamed plastic material between said piston and the other end closure, each of said masses of plastic material being peripherally confined by said bore and characterized by different effective cross-sectional areas in spaced planes normal to said axis.

17. The shock absorber of claim 16, in which said two masses of foamed plastic are of different density.

18. The shock absorber of claim 16, in which both said masses are preloaded in compression between said end closures and against said piston.

19. The shock absorber of claim 16, in which one of said end closures and the adjacent mass of plastic material have aligned openings on said axis and in which said externally accessible connecting means is a piston rod passing through said aligned openings to said piston.

20. A shock absorber, comprising an elongated housing having a longitudinally extending bore extending between two spaced limits on an axis of thrust to be absorbed, the bore opening tapering from a larger effective cross-sectional area near one limit to a smaller effective cross-sectional area near the other limit, an elongated mass of foamed plastic material of generally prismatic external configuration having an initial undeformed profile conforming to and guided by said bore near said one limit, and a piston abutting the end of said plastic material near said one limit.

21. The shock absorber of claim 20, in which the effective cross-sectional area of said mass is different at different longitudinally spaced planes normal to said axis.

22. A shock absorber, comprising an elongated housing having a longitudinally extending bore extending between two spaced limits on an axis of thrust to be absorbed, the bore being generally cylindrical with a first radius about said axis near one limit and being generally cylindrical with a second radius about said axis near the other limit, the bore including an intermediate portion tapering from one to the other of said radii, an elongated generally cylindrical mass of foamed plastic material having an initial undeformed profile of substantially the larger of said radii and guided within the bore at such larger radius, and piston means abutting the end of said plastic mass near the adjacent limit.

23. The shock absorber according to claim 22, in which said piston means includes a first piston element of external radius to clear the smaller bore radius, a second piston element of external radius to derive axially guided support from that part of the bore which has the larger radius, and longitudinally slidable means cooperating between said elements and supporting said first element for axial movement with respect to said second element in the direction of the tapered and smaller-radius parts of the bore.

24. The shock absorber of claim 23, in which said piston means further includes yieldable means yieldably holding said elements in side-by-side adjacency, said yieldable means being effective to retain such adjacency in the absence of thrust displacing said second element into interference with said tapering portion, whereby in the presence of greater thrust applied to said first element, said first element may further displace and compress said mass toward the limit of lesser radius.

25. An energy-absorbing structure, comprising a compressionally yieldable mass of foamed plastic material having a generally prismatic external contour which is adapted to sustain a transient application of force on an alignment axis passing through said mass, said contour including a body portion having a plurality of longitudinally spaced peripherally extending external grooves, whereby said body portion is characterized by an effective cross-sectional area in planes normal to said axis, which area varies as a function of distance along said axis and first and second opposed relatively incompressible load-sustaining members in compressional load-applying relation with the axial ends of said mass, said members being of effective cross-sectional areas embracing the maximum cross-sectional area of said mass.

26. The structure of claim 25, in which the effective depth of one of said grooves differs from that of another of said grooves.

27. The structure of claim 25, in which the effective width of one of said grooves differs from that of another of said grooves.

28. An energy absorbing structure, comprising a housing with an elongated bore of substantially constant cross-section, first and second relatively incompressible load-sustaining members carried by said housing in axially spaced relation and substantially closing said bore at spaced locations, one of said members being movable in said bore, and a solid mass of compressionally yieldable foamed plastic material having a generally prismatic external contour confined by said housing and said members and adapted to sustain a transient application of compressional force due to relative displacement of said members toward each other, said contour including an outer periphery generally conforming to said cross-section and a peripherally continuous groove, whereby said foamed mass is characterized by a first cross-sectional area at a first plane normal to said axis and spaced from said groove, and by a lesser cross-sectional area to a second plane normal to said axis at the location of said groove, so that on compressional loading via said members, the progressive absorption of load may be characterized by essentially pure compression of axially spaced regions of developing different densities.

(References on following page)

References Cited by the Examiner

UNITED STATES PATENTS

| | | | |
|---|---|---|---|
| 98,540 | 1/1870 | Alden | 267—63 |
| 2,348,101 | 5/1944 | Appel | 267—1 |
| 2,499,379 | 3/1950 | Garrett | 60—26.1 |
| 2,729,618 | 1/1956 | Muller et al. | 267—1 |
| 2,875,731 | 3/1959 | Settles et al. | 173—162 |
| 3,037,764 | 6/1962 | Paulsen | 267—63 |
| 3,081,992 | 3/1963 | Kessler | 267—1 |
| 3,084,926 | 4/1963 | Lemelson | 267—1 |
| 3,144,247 | 8/1964 | Szonn et al. | 267—1 |

FOREIGN PATENTS 1,127,671  4/1962  Germany.

FRED C. MATTERN, Jr., *Primary Examiner.*

MILTON KAUFMAN, *Examiner.*

L. P. KESSLER, *Assistant Examiner.*